United States Patent [19]
Enniss et al.

[11] Patent Number: 5,386,967
[45] Date of Patent: Feb. 7, 1995

[54] BALL VALVE COUPLING

[75] Inventors: Dan O. Enniss, Sandy; Robert E. Gooch, Orem; Stephen R. Chipman, Provo, all of Utah

[73] Assignee: Valtek Incorporated, Springville, Utah

[21] Appl. No.: 80,281

[22] Filed: Jun. 21, 1993

[51] Int. Cl.⁶ ............................................. F16K 5/06
[52] U.S. Cl. ............................ 251/315.04; 251/315.16
[58] Field of Search ..... 251/315 R, 315 CE, 315 DV, 251/ 315 BC

[56] References Cited

U.S. PATENT DOCUMENTS

| | | | |
|---|---|---|---|
| 2,998,223 | 8/1961 | Baxter | 251/315 BC |
| 3,167,300 | 1/1965 | Kaiser | 251/315 CE |
| 3,744,755 | 7/1973 | Gary, Jr. et al. | 251/315 CE |
| 4,936,546 | 6/1990 | Bercham | 251/315 CE |
| 5,181,691 | 1/1993 | Taniguchi et al. | 251/315 BC |

*Primary Examiner*—John C. Fox
*Attorney, Agent, or Firm*—Thorpe North & Western

[57] ABSTRACT

A coupling for use in a rotary Ball valve having a spherical ball with a passageway therethrough controlling the flow of fluid through the valve. The coupling is particularly suited for use with non-metallic, for example, ceramic, spherical balls which are rotated by torque applied to a metallic actuator shaft extending from the valve body. The coupling includes a plurality of depressions and protrusions formed at the interface of the non-metallic and metallic components. The depressions and protrusions are positioned away from the central axis of the spherical ball. A cushion is interposed between the metallic and non-metallic components to further disperse the force applied to the non-metallic component so that as torque is applied to the shaft the non-metallic component is rotated without breakage thereof.

15 Claims, 7 Drawing Sheets

BALL VALVE COUPLING

BACKGROUND

1. The Field of the Invention

This invention relates to valves used to control the flow of fluids. More particularly, the present invention relates to valves used to control the flow of erosive or corrosive fluids.

2. The Background Art

Valves of various types are crucial components in many industrial process and fluid transportation systems. In many instances, a valve will be required to handle an erosive, corrosive, or other fluid which is incompatible with metallic pipes and components. In order to handle such fluids, it is often necessary to line pipes and other components which come in contact with the fluid with materials such as plastic or ceramic materials.

Valves which come into contact with erosive or corrosive fluids present particular problems. Since the components of the value must move to control the fluid flow, it is a particular challenge to make a valve which can carry out its fluid flow control functions while being fabricated from a material which is compatible with the fluid.

In particular, valves which control the flow of erosive or corrosive fluids require that liners, seats, plugs, balls, and other wetted parts, be made of compatible, i.e., non-metallic, materials. The problems which have hindered the use of non-metallic wetted parts often arise because of the interface between metallic and non-metallic components in the valve. In particular, the interface between the metallic actuator components and the non-metallic flow controlling element often presents problems.

For example, in a rotary ball valve a rotating spherical ball, provided with a cylindrical passageway therethrough, acts as a flow control element in cooperation with a conical seat formed in the valve body. A shaft or stem connects the spherical ball element, through appropriate seals, to an external actuator. The shaft transmits the force necessary to turn the spherical ball to control the flow of fluid through the valve.

FIG. 1 is a diagrammatic representation of one such rotary ball valve as is known in the art. The valve represented in FIG. 1 includes valve housing components 14 and shaft 20. The rotation of the shaft 20 controls the flow of fluid through the valve. The valve housing components 14 and the shaft 20 can be fabricated from steel or other material known in the art. The valve housing components 14 and the shaft 20 do not come into regular contact with the fluid and thus can be fabricated from conventional materials.

A seating assembly 12 is fabricated from a material which is compatible with the fluid, for example, a ceramic material. A spherical ball element 10 is positioned within the seating assembly. The spherical ball element 10 is also fabricated from a material which is compatible with the fluid, for example, a ceramic material. The spherical ball element 10 is provided with a passageway, shown in cross section at 16, through which the fluid passes when the valve is in the open position as illustrated in FIG. 1.

When fluid is impinging upon the valve in the direction of arrow F, dynamic forces caused by the flow of the fluid through the valve, and static forces developed when the valve is shut off, as well as the differential pressures, forces the spherical ball element 10 against the seating assembly 12. The spherical ball element 10 and the seating assembly 12 together form a sealing relationship at the location represented at 18 (which has been represented in a slightly exploded configuration to show the pertinent structures).

In addition to the forces just described, frictional forces are created by the contact of the spherical ball element 10 and the seating assembly 12. Additional forces are also created from contact of the spherical ball element 10 with residual material deposited from the fluid in contact with the spherical ball element 10. In particular, high frictional forces can develop when an abrasive material is included in the fluid, e.g., a slurry, coming in contact with the valve. The abrasive material can become trapped between in the sealing interface 18 between the spherical ball element 10 and the seating assembly 12 in sufficient quantity to encapsulate the spherical ball element 10. All of these described forces require that additional torque be applied to rotate the spherical ball element 10.

When non-metallic materials are used for the spherical ball element 10, for example a ceramic material, high compression strength to provide erosion resistance is often provided, but, disadvantageously, such materials often exhibit low toughness and tensile strength. Most disadvantageously, in the available devices, the interface between the steel shaft 20 and the spherical ball element 10 is prone to fracture and failure during application of high torque needed to overcome the forces described earlier and operate the valve.

As illustrated in FIG. 1, a key 22 formed on the end of the shaft 20 which is received into a corresponding key way formed on the central axis of the spherical ball element 10 is the general structure used in the prior devices to interface the two components. Alternatively, some prior devices utilize a hexagonal shaped key. The torque applied to turn the shaft 20 and the spherical ball element 10 during operation of valve can cause the fracture of the spherical ball element 10 resulting in failure of the valve.

In view of the forgoing, it would be an advance in the art to provide a more reliable valve utilizing a non-metallic spherical ball element which is less prone to fracture and breakage.

BRIEF SUMMARY AND OBJECTS OF THE INVENTION

In view of the above described state of the art, the present invention seeks to realize the following objects and advantages.

It is a primary object of the present invention to provide a more reliable fluid valve wherein a non-metallic flow control element is used.

It is also an object of the present invention to provide a fluid valve wherein the interface between the wetted non-metallic components and the non-wetted metallic components more efficiently transmits the force applied to operate the valve.

It is a further object of the present invention to provide a coupling between the flow control element of the valve and the actuation structures of a fluid valve which will avoid breakage, fractures, and deformation of the flow control element.

It is an additional object of the present invention to provide a coupling between a ceramic flow control element used in a fluid valve and the actuation structures of the valve which avoids fracture or breakage of the flow control element when force is applied to operate the valve.

These and other objects and advantages of the invention will become more fully apparent from the description and claims which follow, or may be learned by the practice of the invention.

The present invention provides a coupling between a fluid control element and an actuation shaft in a fluid control valve. As the actuation shaft rotates, the fluid control element is rotated and it controls the flow of fluid through the valve. The fluid control element is preferably a non-metallic, e.g., ceramic, spherical ball having a passageway therethrough. The ceramic or other non-metallic material should be compatible with any erosive or corrosive fluid flowing through the valve.

The coupling functions to transmit the force applied to the actuation shaft to the fluid control element which, without the structures of the present invention, would be prone to fracture, breakage, or deformation. The coupling provides an interface between the dissimilar materials (e.g., ceramic and steel) of the actuation shaft and the fluid control element.

The interface has a first side and a second side and includes a plurality of interengaging means for fixing the first side and the second side in a fixed relationship such that as the first side is rotated the second side rotates in the direction of the first side. In one preferred embodiment, the interengaging means comprises protrusions and corresponding depressions, for example, fingers and sockets. The depressions and protrusions are structured so that the force of rotation is spread over a relatively large surface area of the fluid control element.

A cushion means is also preferably interposed between the protrusions and the depressions at the coupling interface. The cushion means preferably comprises a resilient or compliant material which functions to further distribute the force applied by the actuation shaft.

All of the interengaging means are positioned away from the central axis of the fluid control element to reduce the force applied at the interface for a given torque applied to the actuation shaft. Preferably, the interengaging means are positioned at a location not closer to the central axis than ten percent of the distance from the central axis to the perimeter of the fluid control element. More preferably, the interengaging means are positioned at a location in the range from ten percent to ninety percent of distance from the central axis to the perimeter of the fluid control element. Locating the interengaging means away from the central axis allows torque to be applied to the actuation shaft and to the flow control element without breakage thereof.

BRIEF DESCRIPTION OF THE DRAWINGS

In order to better appreciate how the above-recited and other advantages and objects of the invention are obtained, a more particular description of the invention briefly described above will be rendered by reference to a specific embodiment thereof which is illustrated in the appended drawings. Understanding that these drawings depict only a typical embodiment of the invention and are not therefore to be considered limiting of its scope, the invention will be described and explained with additional specificity and detail through the use of the accompanying drawings in which.

DETAILED DESCRIPTION OF THE PREFERRED EMBODIMENTS

Reference will now be made to the drawings wherein like structures will be provided with like reference designations.

Figure 2:
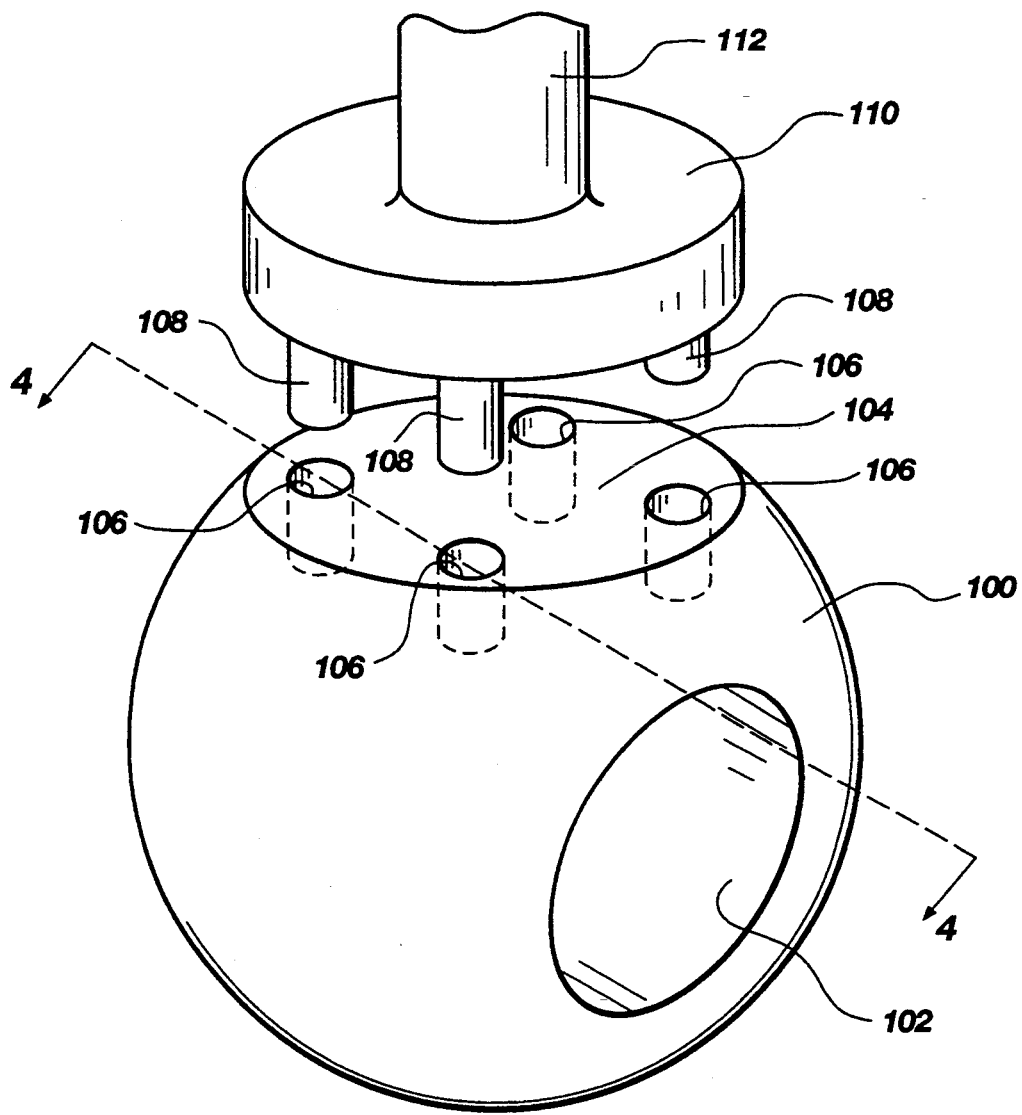
FIG. 2 is a perspective view of a first presently preferred embodiment of the present invention.

As discussed earlier, it is necessary in many instances to fabricate wetted components of a valve with non-metallic materials which are compatible with the fluid flowing through the valve. In FIG. 2, a flow control element 100 is represented. The flow control element 100 is preferably fabricated from a ceramic material. Other materials, generally non-metallic materials but metallic materials are also contemplated, can also be used within the scope of the present invention as are now known, or will be known in the future, in the art.

Figure 1:
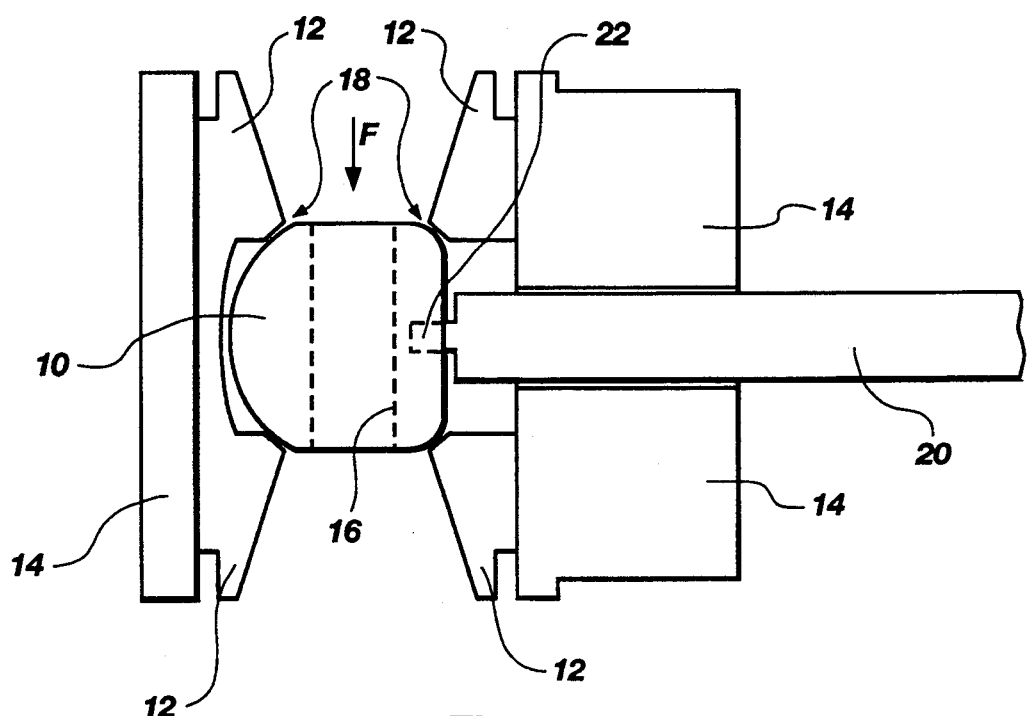
FIG. 1 is a diagrammatic representation of a previously available valve including a non-metallic spherical ball element.

The illustrated flow control element 100 represented in FIG. 2 is shaped as a generally spherical ball and can be used in a valve generally arranged as the valve represented in FIG. 1. While the flow control elements described herein are shaped as a spherical ball, other shapes can also be used within the scope of the present invention. The flow control element 100 includes a passageway 102 through which fluid flows when the valve is open.

In order to overcome the problems of breakage at the interface of the steel shaft (20 in FIG. 1) with the flow control element (10 in FIG. 1), which have hitherto been accepted as inevitable in the art, the structures represented in FIGS. 2-8 are provided. As discussed, the prior art teaches use of a single key provided on the end of a steel shaft accompanied by a corresponding key way in the flow control element as represented in FIG. 1. This arrangement produces undue stresses concentrated in a small surface area on the spherical ball element which results in breakage and fracture. While keys of different shapes have been used, a single key formed on the axis of the shaft is still prone to cause breakage.

In contrast to the previously available singular key structure, the present invention utilizes a plurality of fingers 108 which engage a corresponding plurality of sockets 106. In the embodiment illustrated in FIGS. 2-4, the flow control element 100 is provided with a flat surface 104. The fingers 108 are formed on a coupling plate 110. A shaft 112 is connected to the coupling plate 110. The plurality of fingers 108 and their corresponding sockets 106 provide that the torque which is exerted on the shaft 112 to operate the valve is distributed to a plurality of locations and over a relatively large surface area on the flow control element 100.

The four fingers 108 and the corresponding four sockets 106 represented in FIG. 2 is presently preferred. Other numbers can also be used within the scope of the present invention. For example, the numbers of fingers 108 and sockets 106 can be two, three, four, or more. It is also within the scope of the present invention to provide a similar or greater number of finger-like projections and socket-like recesses to interface the shaft 112 to the flow control element 100. For example, a plurality of ridge and valley, structures, or crenelation-like structures, can also be used to interface the shaft 112 to the flow control element 100.

Figure 3:
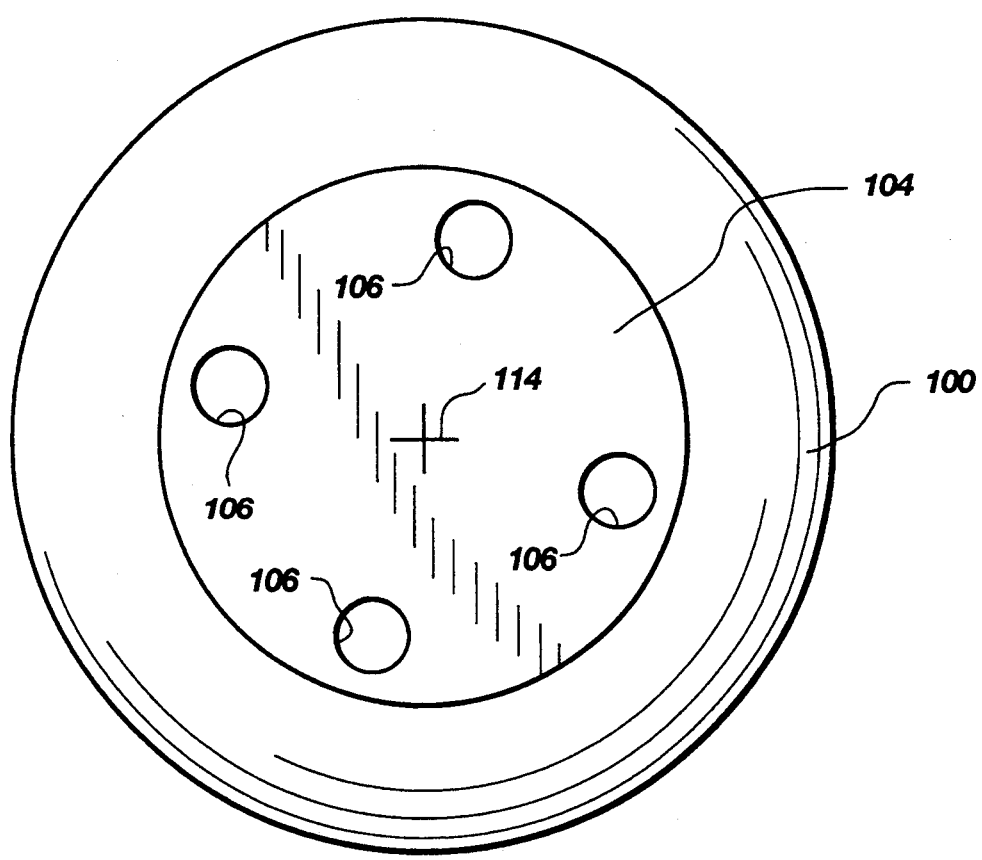
FIG. 3 is a top plan view of the flow control element of the first presently preferred embodiment represented in FIG. 2.

FIG. 3 provides a top plan view of the flow control element 100 represented in FIG. 2. In accordance with the present invention, it is desirable to move the sockets 106 away from the central axis of the flow control element 100. The central axis of the flow control element 100 is indicated at 114. The central axis is the axis about which the flow control element rotates. By positioning the sockets 106 away from the central axis 114 and toward the circumference or perimeter of the flow control element, the applied forces are not concentrated upon a small area or points in the flow control element 100 and thus the likelihood of fracture or breakage is reduced.

It will be appreciated that the position of the sockets 106 and their corresponding fingers 108 can be altered in accordance with the intended application of the finished valve. In instances where little torque is applied to the shaft 112 during operation of the valve, the sockets 106 may be placed closer to the central axis 114, for example, not closer than a range from about ten percent to about thirty percent of the distance from the central axis 114 to the perimeter of the flow control element 100. Alternatively, the sockets 106 may be placed farther from the central axis 114, for example, from about thirty percent to about eighty percent of the distance from the central axis 114 to the perimeter of the flow control element. In the case of a non-spherical flow control element 100, those skilled in the art will also be able to determine the appropriate position for the sockets depending upon the application of the valve.

The illustrated fingers 108 and sockets 106 are merely one presently preferred example of an interengaging means of the present invention. Other structures, both those described herein and all equivalent structures thereof, can function as the interengaging means within the scope of the present invention. Moreover, it will be appreciated that it is within the scope of the present invention to reverse the orientation of the fingers and socket structures, e.g., place the protrusions on the non-metallic component and the corresponding depressions on the metallic component.

Figure 4:
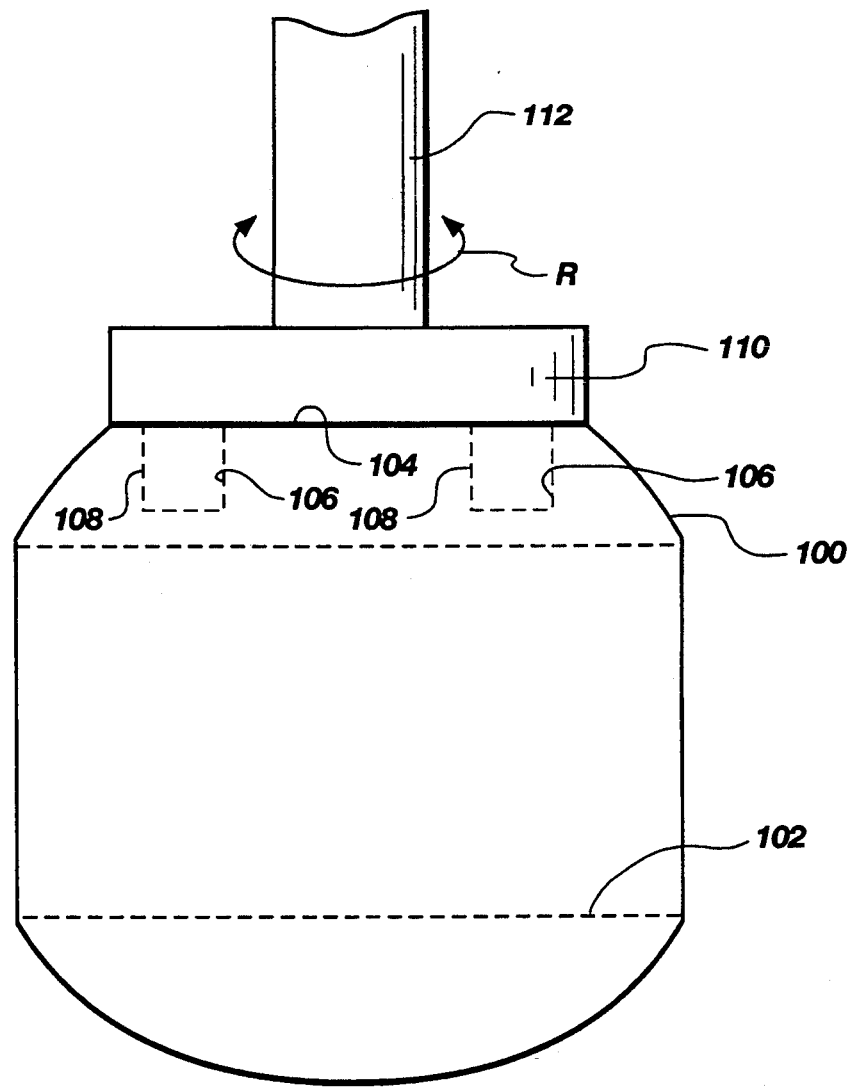
FIG. 4 is a cross sectional view of the flow control element of the first presently preferred embodiment taken along line 4—4 in FIG. 2.

FIG. 4 provides a cross sectional view of the flow control element of the first presently preferred embodiment taken along line 4—4 in FIG. 2. In FIG. 4, the fingers 108 are shown inserted into the sockets 106. The coupling plate 110 preferably fits against the flat surface 104 and the fingers 108 preferably fit tightly into the sockets 106. The described arrangement provides that the torque needed to turn the flow control element 100 in the directions indicated by the arrow R is distributed over much more surface area in than the prior arrangement represented in FIG. 1. As will be appreciated by those skilled in the art, the coupling plate 110 and the fingers 108 are fixed to the flow control element 100 by pressure, friction, or by an adhesive.

Figure 5:
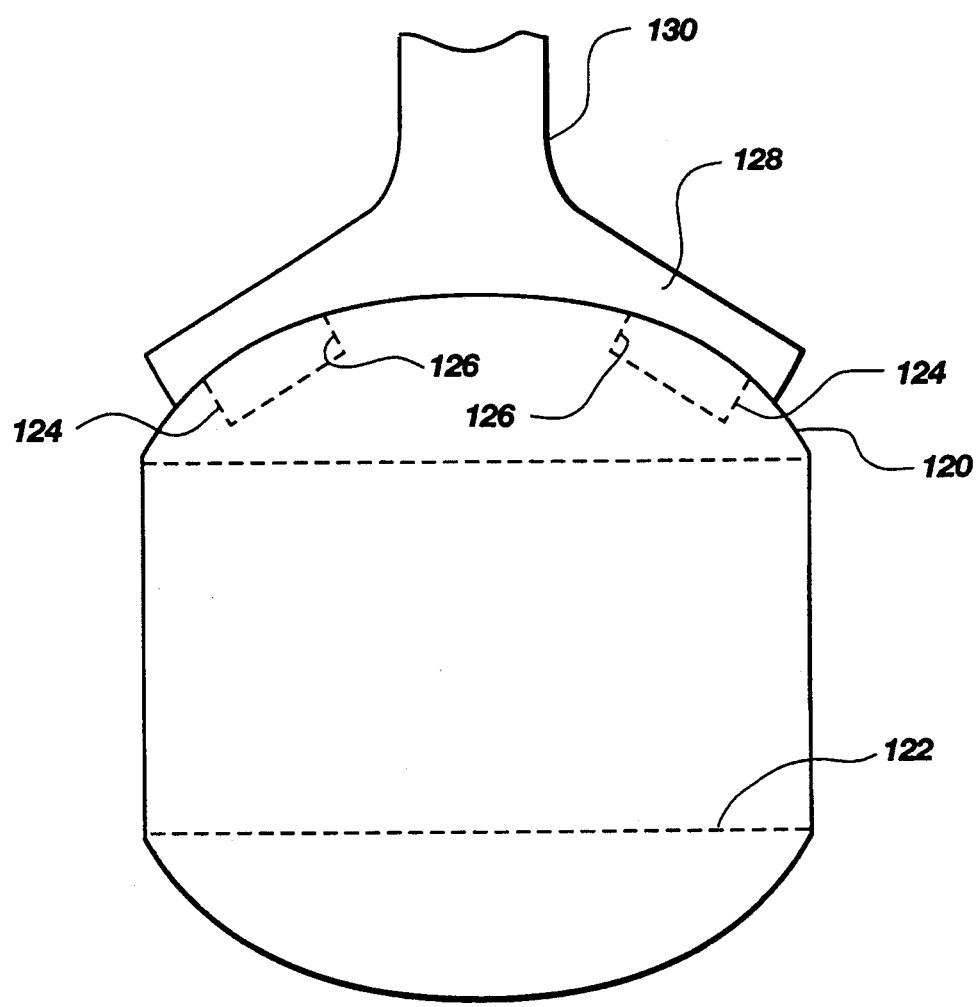
FIG. 5 is a cross sectional view of the flow control element of a second presently preferred embodiment of the present invention.

Another preferred embodiment of the present invention is illustrated in the side view of FIG. 5. In FIG. 5 a flow control element 120 is illustrated which functions essentially similarly to the flow control element 100 represented in FIGS. 2–4. A passageway 122 is provided through the flow control element 120.

A shaft 130 is attached to a curved coupling plate 128. The lower surface of the curved coupling plate 128 matches the shape of the upper surface of the flow control element 120. Rectangular fingers 124 fit into correspondingly shaped rectangular sockets 126. The rectangular fingers 124 and rectangular sockets 126 function essentially similarly to the fingers 108 and sockets 106 represented in FIGS. 2–4.

Figure 6:
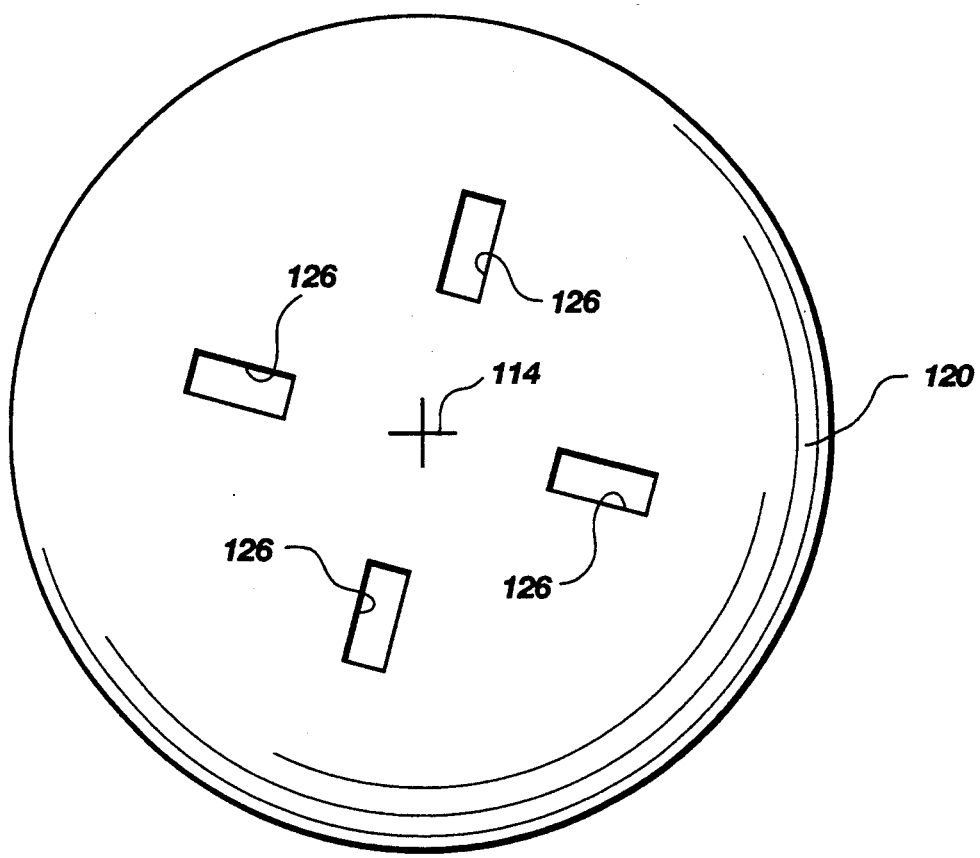
FIG. 6 is a top plan view of the flow control element of the second presently preferred embodiment represented in FIG. 5.

FIG. 6 is a top plan of the flow control element 120 with the rectangular sockets 126. As will now be appreciated, the fingers and their corresponding sockets can be fabricated in many different shapes and assume many different placements on the flow control element.

Figure 7:
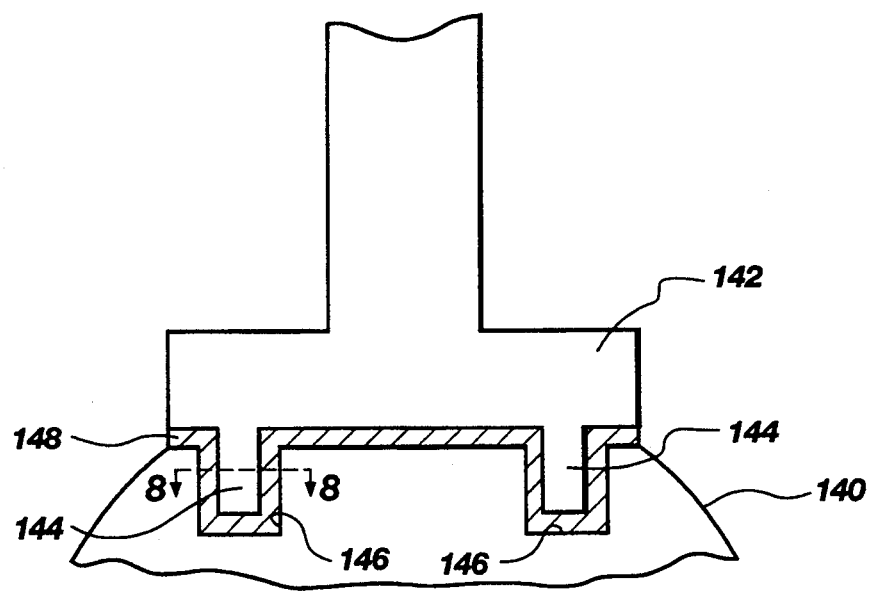
FIG. 7 is a cross sectional view of the flow control element of a third embodiment of the present invention.
Figure 8:
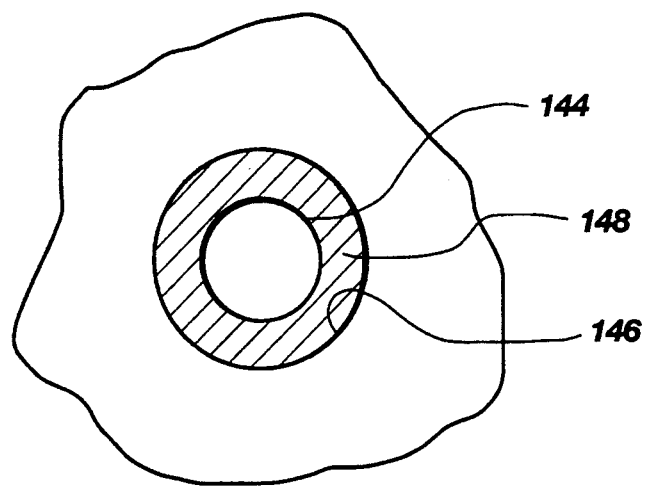
FIG. 8 is a cross sectional view taken along line 8—8 of FIG. 7.

Reference will now be made to FIGS. 7 and 8 which are cross sectional views of another preferred embodiment of the present invention. In FIGS. 7 and 8 a flow control element is represented at 140. Two cylindrically shaped fingers 144 and two correspondingly shaped sockets 146 are also represented as protruding from a coupling plate 142.

As will now be appreciated, it is desirable to spread the force which is necessary to move the flow control element over as much surface area as possible and to avoid point contacts which might cause fractures and breakage of the flow control element. In order to further improve the operation of the present invention, a cushion 146 can be interposed between the fingers 144, the flow control element 140, and the coupling plate 142. It will be understood that the cushion is most desirably positioned between the surfaces which transmit and receive the force generated when operating the valve. Thus, as will be determined by one skilled in the art, the cushion can have a shape and position different than that represented herein.

The cushion 148 is preferably a resilient and compliant material such as a rubber-like material. Other materials can also be used within the scope of the present invention. For example, a silicon gel which cures and hardens can be interposed between the pertinent structures during assembly. Furthermore, the resilient material can be relatively hard and still provide desirable cushioning.

FIG. 8 shows how the finger 144 is surrounded by the cushion 148 so that as force is applied to the finger 144 it is transmitted by the cushion 148 which is held captive against the wall of the socket 146. Use of the cushion 148 is particularly desirable where the dimensional tolerances of the fingers 144 and the sockets 146 are such that an uniform fit may not occur in every instance. In such instances, the cushion 148 avoids the fractures, breakage, or deformation which can occur when force is concentrated in a small area. The cushion 148 can be adapted for use with numerous embodiments of the present invention as determined using the teaching set forth herein. Furthermore, the described cushion 148 is exemplary of the structures which can function as the cushion means of the present invention and other structures equivalent thereto can also be used.

In view of the foregoing, it will be appreciated that the present invention provides a more reliable fluid valve utilizing a non-metallic flow control element which is not prone to breakage and wherein the interface between the wetted non-metallic components and the non-wetted metallic components more efficiently transmits the torque applied to operate the valve. The present invention also provides a coupling between the flow control element of a valve and the actuation structures of the valve to avoid breakage, fractures, and deformation of the flow control element.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A coupling for use in a fluid control valve having a fluid control element which controls the flow of fluid through the valve by rotation of the fluid control element about an axis, the fluid control element having a perimeter, the valve further comprising a shaft which is actuated to cause rotation of the fluid control element, the coupling functioning for transmitting the torque applied to the shaft to the fluid control element via an interface, the interface having a first side and a second side, the coupling comprising:
 a first interengaging means for fixing the first side and the second side in a fixed relationship such that as the first side is rotated the second side rotates in the direction of the first side, the first interengaging means comprising a first protrusion and a complementary and opposing first depression such that the first protrusion is received into the first depression;
 a second interengaging means for fixing the first side and the second side in a fixed relationship such that as the first side is rotated the second side rotates in the direction of the first side, the second interengaging means comprising a second protrusion and a complementary and opposing second depression such that the second protrusion is received into the second depression;
 cushion means interposed between the first protrusion and the first depression and between the second protrusion and the second depression;
 wherein the first interengaging means and the second interengaging means are each positioned away from the axis such that as torque is applied to the shaft the flow control element rotates without breakage.

2. A coupling for use in a fluid control valve as defined in claim 1 wherein the first interengaging means and the second interengaging means are each positioned not closer to the axis than fifteen percent of distance from the axis to the perimeter of the fluid control element.

3. A coupling for use in a fluid control valve as defined in claim 1 wherein the first interengaging means and the second interengaging means are each positioned not closer to the axis than thirty percent of distance from the axis to the perimeter of the fluid control element.

4. A coupling for use in a fluid control valve as defined in claim 1 wherein the first interengaging means and the second interengaging means are each positioned not closer to the axis than forty percent of distance from the axis to the perimeter of the fluid control element.

5. A coupling for use in a fluid control valve as defined in claim 1 wherein the cushion means comprises a resilient material.

6. A coupling for use in a fluid control valve as defined in claim 1 wherein the fluid control element comprises a generally spherical ball having a passageway therethrough.

7. A coupling for use in a fluid control valve as defined in claim 1 further comprising:
 a third interengaging means for fixing the first side and the second side in a fixed relationship such that as the first side is rotated the second side rotates in the direction of the first side, the third interengaging means comprising a third protrusion and a complementary and opposing third depression such that the third protrusion is received into the third depression; and
 a fourth interengaging means for fixing the first side and the second side in a fixed relationship such that as the first side is rotated the second side rotates in the direction of the first side, the fourth interengaging means comprising a fourth protrusion and a complementary and opposing fourth depression such that the fourth protrusion is received into the fourth depression.

8. A coupling for use in a fluid control valve as defined in claim 1 wherein the first and second protrusions each comprise metallic protrusions and the first and second depressions each comprise non-metallic depressions.

9. A coupling for use in a fluid control valve as defined in claim 1 wherein the fluid control element comprises a ceramic fluid control element and wherein the shaft comprises a metallic shaft.

10. A valve comprising:
 a valve body;
 an actuator shaft held within the valve body;
 a flow control element rotatably held within the valve body, the flow control element having at least a first position wherein the flow through the valve is stopped and a second position wherein flow through the valve is allowed, the flow control element having a central axis and an outer perimeter;
 a plurality of depressions positioned on the surface of the flow control element about the central axis and positioned in a region located in the range of from about twenty percent to about eighty percent of the distance from the central axis to the outer perimeter of the flow control element;
 a plurality of protrusions held in a fixed relationship with the shaft, the protrusions complementary in shape to the depressions formed on the flow control element and such that at least two of the protrusions engage at least two corresponding depressions so that as the shaft is rotated the flow control element rotates within the valve body; and
 cushion means interposed between the plurality of protrusions and the plurality of depressions.

11. A valve as defined in claim 10 wherein the protrusions comprise metallic protrusions.

12. A valve as defined in claim 10 wherein flow control element comprises a ceramic material and the depressions comprise depressions in the ceramic material.

13. A valve as defined in claim 10 wherein the cushion means comprises a resilient material.

14. A valve as defined in claim 10 wherein the plurality of depressions comprise at least four depressions positioned on the surface of the flow control element about the central axis and positioned in a region located in the range from about twenty-five percent to about eighty percent of the distance from the central axis to the outer perimeter of the flow control element and wherein the plurality of protrusions comprise at least four protrusions.

15. A coupling for use in a fluid control valve comprising:
- a fluid control element which controls the flow of fluid through the valve by rotation of the fluid control element about an axis, the fluid control element having a perimeter and comprising a non-metallic material;
- a shaft which is actuated to cause rotation of the fluid control element;
- the coupling functioning for transmitting the torque applied to the shaft to the fluid control element via an interface, the interface having a first side and a second side, the coupling comprising:
- a first interengaging means for fixing the first side and the second side in a fixed relationship such that as the first side is rotated the second side rotates in the direction of the first side, the first interengaging means comprising a first protrusion and a complementary and opposing first depression such that the first protrusion is received into the first depression;
- a second interengaging means for fixing the first side and the second side in a fixed relationship such that as the first side is rotated the second side rotates in the direction of the first side, the second interengaging means comprising a second protrusion and a complementary and opposing second depression such that the second protrusion is received into the second depression;
- a third interengaging means for fixing the first side and the second side in a fixed relationship such that as the first side is rotated the second side rotates in the direction of the first side, the third interengaging means comprising a third protrusion and a complementary and opposing third depression such that the third protrusion is received into the third depression;
- a fourth interengaging means for fixing the first side and the second side in a fixed relationship such that as the first side is rotated the second side rotates in the direction of the first side, the fourth interengaging means comprising a fourth protrusion and a complementary and opposing fourth depression such that the fourth protrusion is received into the fourth depression;
- cushion means interposed between the first protrusion and the first depression and between the second protrusion and the second depression and between the third protrusion and the third depression and between the fourth protrusion and the fourth depression; and
- wherein no portion of the first interengaging means, the second interengaging means, the third interengaging means, or the fourth interengaging means is positioned a distance from the axis, the distance being greater than twenty percent of distance from the axis to the perimeter of the fluid control element such that as torque is applied to the shaft the flow control element rotates.

* * * * *